United States Patent
Dangui et al.

(10) Patent No.: US 10,218,454 B2
(45) Date of Patent: Feb. 26, 2019

(54) OPEN, MODULAR, AND SCALABLE OPTICAL LINE SYSTEM

(71) Applicant: Google Inc., Mountain View, CA (US)

(72) Inventors: Vinayak Dangui, Santa Clara, CA (US); Vijayanand Vusirikala, Palo Alto, CA (US); Matthew Newland, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/457,520

(22) Filed: Mar. 13, 2017

(65) Prior Publication Data

US 2018/0262292 A1  Sep. 13, 2018

(51) Int. Cl.
*H04B 10/00* (2013.01)
*H04J 14/02* (2006.01)
*H04Q 11/00* (2006.01)
*H04J 14/00* (2006.01)

(52) U.S. Cl.
CPC ...... *H04J 14/0212* (2013.01); *H04Q 11/0005* (2013.01); *H04Q 2011/0016* (2013.01)

(58) Field of Classification Search
CPC .............. H04B 10/294; H04B 10/2941; H04B 10/2942; H04B 10/296
See application file for complete search history.

(56) References Cited

U.S. PATENT DOCUMENTS

| | | |
|---|---|---|
| 6,069,731 A | 5/2000 | Bayart |
| 8,401,391 B2 | 3/2013 | Kovsh et al. |
| 8,554,081 B2 | 10/2013 | Kovsh et al. |
| 2004/0156095 A1 | 8/2004 | Tsuzaki et al. |
| 2005/0286905 A1 | 12/2005 | Mohs et al. |
| 2006/0222367 A1 | 10/2006 | Onaka et al. |
| 2007/0269211 A1 | 11/2007 | Doerr et al. |

(Continued)

FOREIGN PATENT DOCUMENTS

| | | |
|---|---|---|
| JP | H05218974 A | 8/1993 |
| WO | 2008135965 A1 | 11/2008 |
| WO | 2015058805 A1 | 4/2015 |

OTHER PUBLICATIONS

International Search Report and Written Opinion dated Mar. 29, 2018 in PCT Application No. PCT/US2017/064660.

(Continued)

*Primary Examiner* — Daniel Dobson
(74) *Attorney, Agent, or Firm* — McDermott Will & Emery LLP

(57) ABSTRACT

A reconfigurable optical add/drop multiplexer (ROADM) includes a plurality of interconnected ROADM blocks. Each ROADM block includes an ingress switchable-gain amplifier, an output power detector coupled to an output of the ingress switchable gain amplifier, and a wavelength-selective switch coupled to the output of the ingress switchable gain amplifier. Each ROADM block includes a plurality of add/drop blocks coupled to the wavelength-selective switches of the plurality of ROADM blocks. The ROADM includes a controller configured to receive an indication of an output signal power from the output power detector and adjust gain and equalization parameters of the ingress switchable-gain amplifier based on the received indication of the output signal power.

20 Claims, 7 Drawing Sheets

(56) References Cited

U.S. PATENT DOCUMENTS

| | | | |
|---|---|---|---|
| 2009/0041457 A1* | 2/2009 | Maki | H04J 14/0204 |
| | | | 398/45 |
| 2009/0129773 A1 | 5/2009 | Oron | |
| 2009/0226168 A1 | 9/2009 | Boduch | |
| 2010/0202777 A1 | 8/2010 | Liu et al. | |
| 2012/0188631 A1* | 7/2012 | Shukunami | H04B 10/2941 |
| | | | 359/337.1 |
| 2012/0237212 A1 | 9/2012 | Nishihara et al. | |
| 2016/0315708 A1 | 10/2016 | Kachita et al. | |

OTHER PUBLICATIONS

Shin, Jang-Uk, et al. Reconfigurable Optical Add-Drop Multiplexer Using a Polymer Integrated Photonic Lightwave Circuit, ETRI Journal, vol. 31, No. 6, pp. 770-777, Dec. 2009.

Combined Search and Examination Report dated Jun. 6, 2018 in UK Patent Application No. 1720998.2.

Office Action dated Nov. 26, 2018 in Taiwanese Patent Application No. 106144312, and English translation thereof.

\* cited by examiner ns from the

OPEN, MODULAR, AND SCALABLE OPTICAL LINE SYSTEM

BACKGROUND

Reconfigurable optical add/drop multiplexers (ROADMs) perform routing, adding, equalization, and dropping of optical signal in an optical line system. ROADMs can include amplifiers for boosting the power of optical signals. Many common optical signal amplifiers have non-uniform gain characteristics, however. For example, an optical signal amplifier amplifying a broadband optical signal, such as a wavelength-division multiplexing signal, may not amplify all wavelengths of the signal equally. For an optical signal passing through multiple amplifiers in a ROADM, through two or more ROADMs, or through one or more line amplifiers between two ROADMs, the cumulative effect of non-uniform amplification can result in some wavelengths of the signal having too much power while other wavelengths have too little power. Equalization can be applied to flatten the optical signal based on feedback of the power spectral density of the signal. Traditionally, however, this has required a closed-loop system between terminal devices in communication with each other and sharing a common communication protocol, typically meaning that terminal equipment had to be vendor consistent to perform feedback-based control.

SUMMARY

At least one aspect is directed to a reconfigurable optical add/drop multiplexer (ROADM). The ROADM includes a plurality of interconnected ROADM blocks. Each ROADM block includes an ingress switchable-gain amplifier, an output power detector coupled to an output of the ingress switchable gain amplifier, and a wavelength-selective switch coupled to the output of the ingress switchable gain amplifier. The ROADM includes a plurality of add/drop blocks coupled to the wavelength-selective switches of the plurality of ROADM blocks. The ROADM includes a controller configured to receive an indication of an output signal power from the output power detector and adjust gain and equalization parameters of the ingress switchable-gain amplifier based on the received indication of the output signal power.

At least one aspect is directed to a method of operating a reconfigurable optical add/drop multiplexer (ROADM). The method includes receiving a wavelength-division multiplexing (WDM) optical signal over an optical fiber link at a first ROADM block of a plurality of ROADM blocks. The method includes amplifying the WDM optical signal using the ingress switchable-gain amplifier. The method includes detecting an output signal power of the amplified WDM optical signal using an output power detector coupled to an output of the ingress switchable-gain amplifier. The method includes adjusting, by a controller connected to the first ROADM block, gain and equalization parameters of the ingress switchable-gain amplifier based on the detected output signal power. The method includes sending, using a wavelength-selective switch of the first ROADM block, an optical channel signal from the amplified WDM optical signal to a second ROADM block of the plurality of ROADM blocks.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
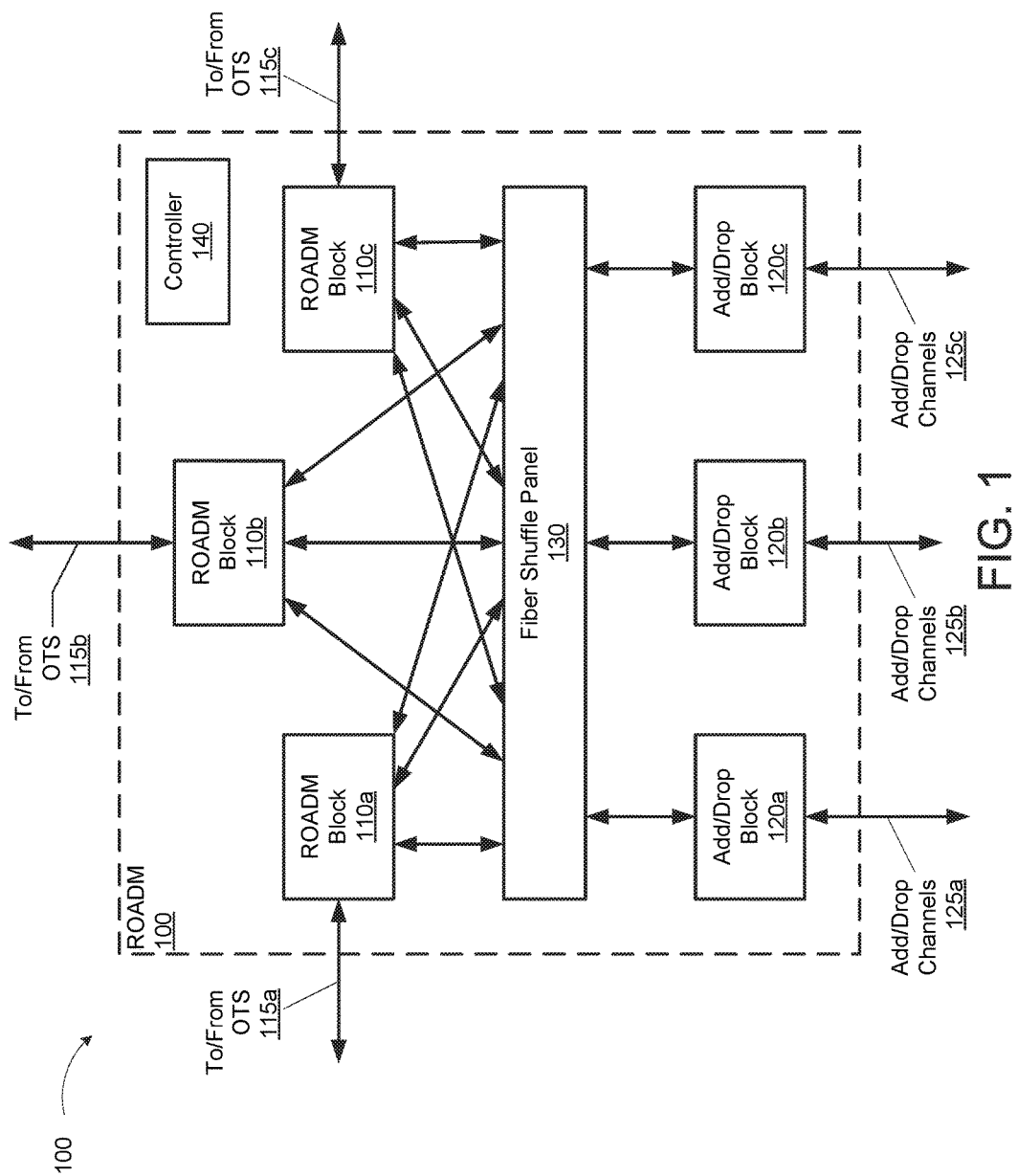
FIG. 1 is a block diagram of a reconfigurable optical add/drop multiplexer (ROADM), according to an illustrative implementation.

Systems and methods of this disclosure relate generally to a reconfigurable optical add/drop multiplexer (ROADM) with one or more local feedback control loops. A ROADM can switch traffic of a wavelength-division multiplexing (WDM) system at the wavelength layer. For example, the ROADM can add, drop, or route individual or multiple wavelengths carrying data without the need to convert the signals on all of the WDM optical signal channels from the optical domain to the electronic domain and back.

The addition of local feedback loops within the ROADM allows the ROADM to function as a modular, interchangeable component of an optical transport line system. Traditionally, optical transport line systems include end-to-end proprietary software control that requires each component to communicate with the other components, generally limiting an optical transport line system to equipment from a single vendor. Such end-to-end dependencies make it difficult or impossible to replace or upgrade an individual component unless the replacement either implements the same control scheme (i.e., is from the same vendor and is designed to work with the legacy system) or all other component in the particular control loop are replaced simultaneously.

The ROADM local feedback control loops can maintain the total power and/or power spectral density flatness across the bandwidth of the WDM signals within a specified range. This enables interoperability at the optical component level, because the ROADM controls the output at each interface based on analog specifications for the optical signal itself. Several features including, but not limited to, the features set forth below enable local control of the ROADM. Not all features are required in every embodiment.

The ROADM can employ switchable-gain amplifiers. The amplifiers can be of various types including laser amplifier blocks such as erbium-doped fiber amplifiers, fiber amplifiers, and Raman amplifiers. Each amplifier can have switchable gain for controlling the gain and output power of the optical signal. The switchable gain can be achieved by using switches to direct the optical signal to either a low-gain or a high-gain amplifier path. The switchable gain can additionally or alternatively include a variable-gain amplifier.

The ROADM can employ noise loading at selected nodes to add a "dummy" or "null" optical signal to unused channels. This creates a network condition similar to a full channel load. The noise loading improves transient performance, simplifies implementation of node-level (local) control, and allows for easier monitoring of the link's margin without having to perform optical signal-to-noise measurements. In instances where the ROADM does not provide sufficient isolation between the noise loading channel and the used channels, an additional wavelength blocker may be added in between the noise loading and the ROADM port.

The ROADM can include equalizers or signal flatteners such as a passive or dynamic-gain equalizer. Because some optical amplifiers have uneven gain profiles across their working bandwidth (amplifying some wavelengths more than others), occasional equalization or "flattening" of the signal may be required to maintain all channels of wavelength-division multiplexed optical signal within a specified amplitude range.

The ROADM can include power detectors including taps and photodiodes for monitoring the power of optical signals in the analog domain. The power detectors may be equipped to discern power spectral density (power at each wavelength) or total power only. A controller or optical channel monitor of the ROADM can use the optical signal power measurements to adjust the settings of the equalizers and the gain of switchable-gain amplifiers to achieve a specified total power and flatness for an interface of the ROADM.

The ROADM can be made up of several blocks. Each block can include, without limitation, one or more amplifiers, switches, multiplexers, and/or power detectors. Each block of the ROADM can be controlled for total power and flatness locally and without software dependencies between blocks. Each block can therefore be equipped with monitoring capabilities for control purposes, such as the power detectors previously described. A controller—either a single central controller, or an individual controller in each block—can receive power measurements from the power detectors and adjust amplifier and equalizer settings as appropriate.

FIG. 1 is a block diagram of a reconfigurable optical add/drop multiplexer (ROADM) 100, according to an illustrative implementation. The ROADM 100 includes three ROADM blocks 110a-110c (collectively "ROADM blocks 110"). In some implementations, the ROADM 100 can include more or fewer ROADM blocks 110. The ROADM 100 includes three add/drop blocks 120a-120c (collectively "add/drop blocks 120"). In some implementations, the ROADM 100 can include more or fewer add/drop blocks 120. The ROADM 100 includes a controller 140 for coordinating the operation of the ROADM 100 and its components. In some implementations, the ROADM 100 can optionally include a fiber shuffle panel 130. The fiber shuffle panel 130 can include passive optical connectors for simplifying cabling of the ROADM 100; however, it is possible to route cables among the ROADM blocks 110 and add/drop blocks 120 directly and without use of the fiber shuffle panel.

Each ROADM block 110 connects to a next-hop network element over an optical transmission section (OTS) connection via the optical fiber links 115a-115c (collectively "optical fiber links 115"). Each ROADM block 110 can send and receive wavelength—division multiplexed (WDM) optical signals over the optical fiber links 115. Each ROADM block 110 can demultiplex the WDM optical signal received at its optical fiber link 115 and transmit each individual optical channel signal to the appropriate destination; e.g., another ROADM block 110 or an add/drop block 120a. Similarly, each ROADM block 110 can receive individual optical channel signals from other ROADM blocks 110 and add/drop blocks 120, multiplex them into a WDM optical signal, and transmit the WDM optical signal over the optical fiber links 115.

Each add/drop block 120 can send and receive individual add/drop optical channel signals via the optical fiber links 125a-125c (collectively "optical fiber links 125"). The ROADM 100 can add an individual optical channel signal received at the optical fiber link 125 to a WDM optical signal transmitted from one of the optical fiber links 115. Similarly, the ROADM 100 can break out an individual optical channel signal from a WDM optical signal received at one of the optical fiber links 115, and transmit the individual optical channel signal via an optical fiber link 125.

The ROADM 100 can therefore perform, without limitation, four basic functions: (1) a same-direction express function (e.g., conveying an optical channel signal from optical fiber link 115a to optical fiber link 115c); (2) a different-direction express function (e.g., conveying an optical channel signal from optical fiber link 115a to optical fiber link 115b); (3) add an optical channel signal to a WDM optical signal (add function); and (4) break out an individual optical channel signal from a WDM optical signal (drop function). The ROADM 100 can perform additional functions such as optical signal power detection, optical signal amplification, and optical signal equalization, and can additionally include closed-loop feedback control of optical signal total power and power spectral density. These additional functions and the structures that facilitate them are described in further detail below with regard to FIGS. 2-9.

The ROADM 100 can be a colorless-directionless-contentionless architecture. Colorless means that the ROADM 100 can send or receive any wavelength on any port. Directionless means that the ROADM 100 can route a wavelength across any connected fiber path (also called degree). Contentionless means that the ROADM 100 can add or drop two optical signals having the same wavelength (i.e., an optical signal will not block another optical signal having the same wavelength) if they are destined for different fiber paths.

The controller 140 can coordinate the functions of the ROADM 100 and its components. In some implementations, the controller 140 can include a single central processing unit that can monitor and control each module or block of the ROADM 100 including the ROADM blocks 110 and the add/drop blocks 120. In some implementations, the controller 140 can include distributed processors local to each block or module for performing local monitoring and control of the block or module. In some implementations, the controller 140 can include a combination of central and distributed components. The controller 140 can be implemented in, or include, one or more computer systems such as the computer system 900 described in more detail below with regard to FIG. 9.

Figure 2:
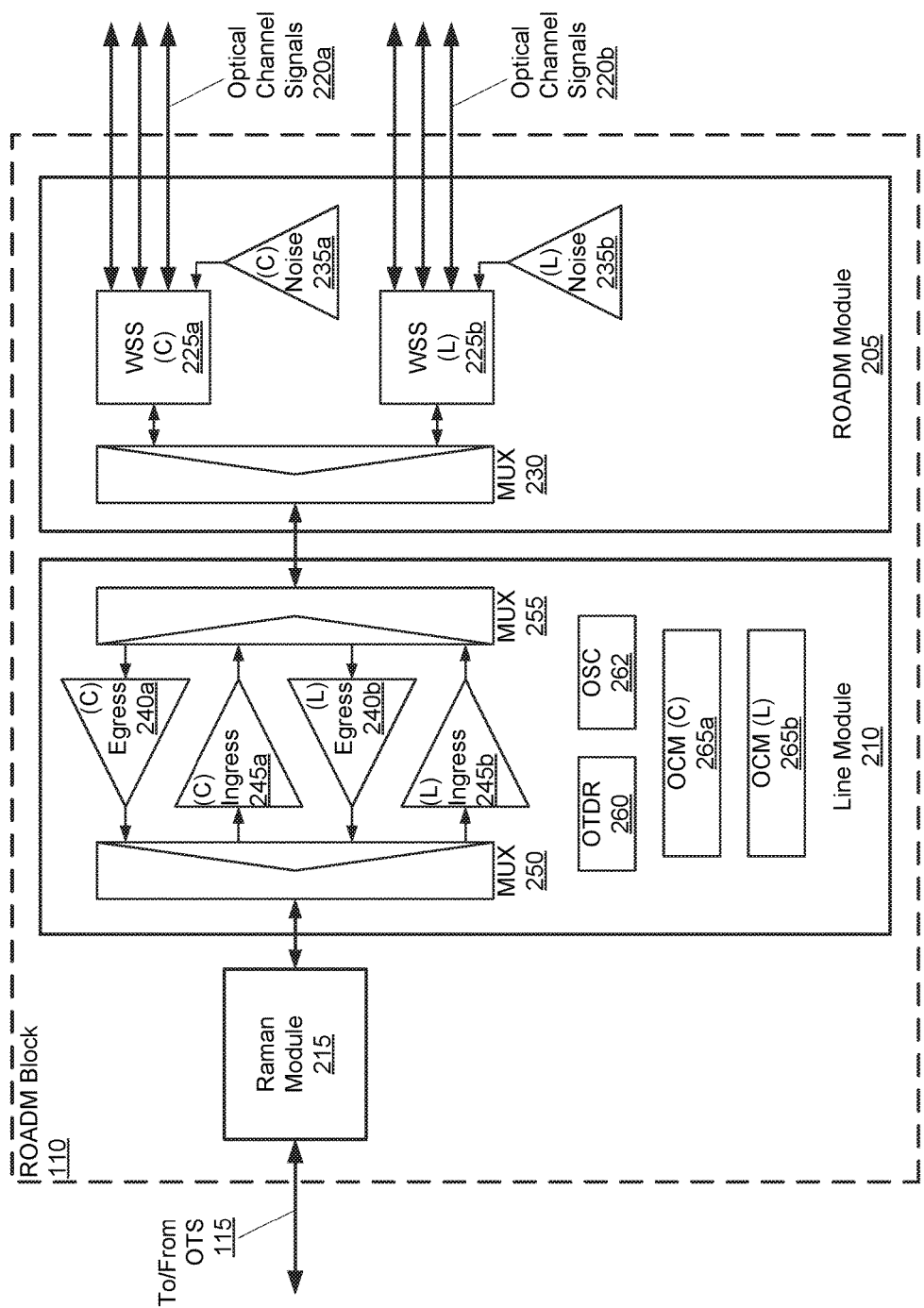
FIG. 2 is a block diagram of a ROADM block of a ROADM, according to an illustrative implementation.

FIG. 2 is a block diagram of a ROADM block 110 of a ROADM 100, according to an illustrative implementation. The ROADM block 110 includes a ROADM module 205 and a line module 210. The ROADM block 110 can optionally include a Raman amplifier module 215 for amplifying an incoming WDM optical signal received over the optical fiber links 115. The ROADM block 110 can demultiplex the WDM optical signal into individual optical channel signals and send them to another ROADM block 110 or an add/drop block 120 over optical fiber links 220a and 220b (collectively "optical fiber links 220"). The ROADM block 110 can multiplex the optical channel signals received over optical fiber links 220 from other ROADM blocks 110 or the add/drop blocks 120 into a second WDM optical signal, and transmit the second WDM optical signal via the optical fiber link 115.

The ROADM module 205 includes one or more wavelength-selective switch (WSS) blocks 225a and 225b (collectively "WSS blocks 225"). The WSS block 225 can demultiplex a WDM optical signal into individual optical channel signals. The WSS block 225 can route any individual optical channel signals to any port. The WSS block 225 can also multiplex individual optical channel signals into a WDM optical signal. In some implementations, the ROADM 100 can handle optical signals in more than one frequency or wavelength band. In some implementations, the ROADM 100 can handle optical signals in both the C-band and the L-band. The ROADM module 205 can include a WSS block 225a for multiplexing and demultiplexing C-band optical channel signals, and a WSS block 225b for multiplexing and demultiplexing L-band optical channel signals. In implementations of the ROADM module 205 that include multiple WSS blocks 225, the ROADM module 205 can include a multiplexer/demultiplexer (MUX) (also referred to as a C/L band splitter/combiner) 230. The MUX 230 can multiplex and demultiplex two or more WDM optical signals carrying optical channel signals in different frequency bands.

In some implementations, the ROADM module 205 can optionally include one or more noise amplifiers 235a and 235b (collectively "noise amplifiers 235"). The noise amplifiers 235 can add a "dummy" or "null" optical signal to one or more unused ports of the WSS block 225. In implementations where the ROADM 100 can handle optical signals in two frequency bands, each WSS block 225 may be associated with noise amplifiers 235 that can produce an optical signal in the frequency band handled by the WSS block 225. The WSS blocks 225 and the noise amplifiers 235 are discussed in further detail below with regard to FIG. 6.

The line module 210 includes one or more egress amplifiers 240a and 240b (collectively "egress amplifiers 240"), and one or more ingress amplifiers 245a and 245b (collectively "ingress amplifiers 245"). The egress amplifiers 240 amplify an outgoing WDM optical signal. The ingress amplifiers 245 amplify an incoming WDM optical signal. In some implementations, the ROADM 100 can handle optical signals in more than one frequency or wavelength band. In some implementations, the ROADM 100 can handle optical signals in both the C-band and the L-band. The line module 210 can include an egress amplifier 240a for amplifying an outgoing C-band WDM optical signal, and an egress amplifier 240b for amplifying an outgoing L-band WDM optical signal. Similarly, the line module 210 can include an ingress amplifier 245a for amplifying an incoming C-band WDM optical signal, and an ingress amplifier 245b for amplifying an incoming L-band WDM optical signal. In implementations of the line module 210 that include multiple egress amplifiers 240 and ingress amplifiers 245, the line module 210 can include a MUX 250 and a MUX 255 for multiplexing and demultiplexing two or more WDM optical signals carrying optical channel signals in different frequency bands. The egress amplifiers 240 and ingress amplifiers 245 can be switchable-gain amplifiers such as those described in further detail below with respect to FIGS. 3 and 4.

In some implementations, the line module 210 can optionally include an optical time-domain reflectometer (OTDR) 260 and an optical supervisory channel (OSC) 262. The OTDR 260 can use optical time-domain reflectometry to detect and locate a discontinuity along an optical channel, including on an optical fiber link outside of the ROADM 100. For example, a damaged or severed optical fiber will have a discontinuity of refractive index at the break that will reflect a portion of an optical signal traveling in the fiber. The OTDR 260 can detect the reflection and hence detect the discontinuity. The OTDR 260 can measure time elapsed between transmission of a test signal and receipt of the resulting reflection, and calculate the distance to the discontinuity based on the speed of light through the optical fiber.

The OSC 262 is device in the ROADM 100 that can use an additional wavelength, possibly outside of the bandwidth of the ROADM 100 amplifiers, send and receive information about optical signals on the line and for exchanging conditions of equipment at each terminal of an optical fiber link.

In some implementations, the line module 210 can optionally include one or more optical channel monitors (OCMs) 265a and 265b (collectively "OCMs 265"). The OCM 265 can measure wavelength, power, and optical signal-to-noise ratio (OSNR) of an optical channel without directly looking at the sequence of bits carried by channel. In some implementations, the OCM 265 can receive optical signal power measurements from optical signal power detectors such as the power detector 310 described below with regard to FIG. 3. The OCMs 265 and the controller 140 can use the measured optical signal power to determine whether to employ equalization on an optical signal passing through the ROADM block 110. In some implementations, the line module 210 can include an OCM 265 for each signal band passing through the line module 210. In some implementations, the OCM 265a can monitor C-band optical signals and the OCM 265b can monitor L-band optical signals.

In some implementations, the line module 210 can optionally include a Raman amplifier module 215. The Raman amplifier module 215 can amplify signals received or transmitted over the optical fiber link 115. The Raman amplifier module 215 is described in further detail below with regard to FIG. 5.

Figure 3:
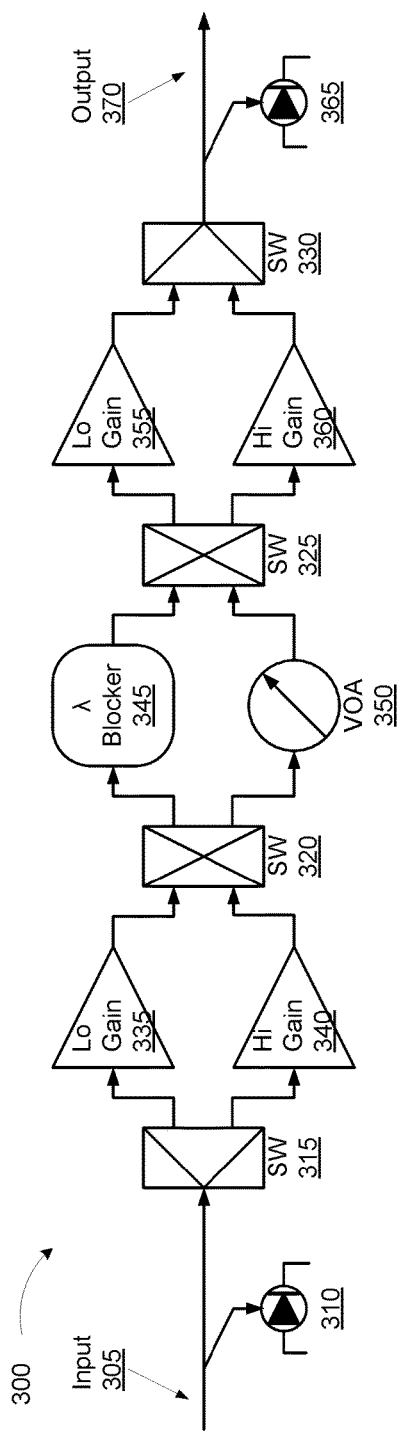
FIG. 3 is a schematic of an example switchable-gain amplifier for use in a ROADM, according to an illustrative implementation.

FIG. 3 is a schematic of an example switchable-gain amplifier 300 for use in a ROADM 100, according to an illustrative implementation. The switchable-gain amplifier 300 can be used as an egress amplifier 240, an ingress amplifier 245, or as one amplifier of the amplifier array 710 of the add/drop block 120 further described with respect to FIG. 7 below. The switchable-gain amplifier 300 can amplify an optical signal with various levels of gain and, in some implementations, apply equalization as well. The switchable-gain amplifier 300 includes a low-gain path and a high-gain path. The switchable-gain amplifier 300 additionally includes a flat-gain path and a dynamic gain equalization path. The switchable-gain amplifier 300 can switch between the various gain modes.

The switchable-gain amplifier 300 includes an input power detector 310 at the input 305. The input power detector 310 can include a tap and a photodetector. The tap can split a small portion of the input optical signal at the input 305 and direct it to the photodetector. The photodetector can include a photodiode or other light-sensitive semiconductor, sensor, or device. In some implementations, the input power detector 305 can discern power spectral density. That is, the input power detector 310 can determine the power level at different wavelengths of a WDM optical signal. In some implementations, the input power detector 310 can only discern total power density.

In some implementations, the switchable-gain amplifier 300 may be on the edge of the ROADM 100; i.e., the input 305 of the switchable-gain amplifier 300 may directly connect to the optical fiber link 115. In such implementations, the input power detector 310 is effectively at the input of the ROADM 100, and can be used to ensure that an incoming signal at the optical fiber link 115 is within expected parameters for amplitude and flatness. If the incoming optical signal is not within those parameters, the controller 140 and/or the optical channel monitor 265 may determine that something outside of the ROADM 100—e.g., the optical fiber link 115 or remote equipment sharing the optical fiber link 115—has failed. The OSC/OTDR 260 may be able to provide additional information about the failure and its location. The controller 140 and/or the optical channel monitor 265 can issue an alarm indicating a possible issue involving the optical fiber link 115 or a neighboring network element on the optical fiber link 115.

The switchable-gain amplifier 300 includes switches 315, 320, 325, and 330. The switches 315, 320, 325, and 330 can route the optical signal through the low- or high-gain amplifier blocks, and through an equalizing or non-equalizing attenuator. The first switch 315 can route the optical signal to the first-stage low-gain amplifier block 335 or high-gain amplifier block 340. The second switch 320 can receive the optical signal from the selected first-stage amplifier block and route it to either the wavelength blocker 345 or the variable optical attenuator (VOA) 350.

The wavelength blocker 345 can equalize the optical signal by selectively attenuating one or more wavelengths. Placing the wavelength blocker 345 between the first and second gain stages can preserve output power relative to placement after the second gain stage. Placing the wavelength blocker 345 between the first and second gain stages can also minimize optical signal-to-noise penalty by compounding the span loss with the wavelength blocker 345 insertion loss. In some implementations, however, the wavelength blocker 345 can be placed before or after the first and second gain stages. The wavelength blocker 345 is a spectrally-selective device, capable of providing a given attenuation (or even completely block) across a range of frequencies, with a specified frequency-resolution.

The third switch 325 can receive the optical signal from the selected attenuator and route it to the second-stage low-gain amplifier block 355 or high-gain amplifier block 360. The fourth switch 330 can receive the optical signal from the selected second-stage amplifier block and route it to the output 370. The switchable-gain amplifier 300 includes an output power detector 365. The output power detector 365 is similar to the input power detector 310. The output power detector 365 includes a tap and a photodetector. The tap can split a small portion of the input optical signal from the output 370 and direct it to the photodetector. The photodetector can include a photodiode or other light-sensitive semiconductor, sensor, or device. In some implementations, the output power detector 365 can discern power spectral density. That is, the output power detector 365 can determine the power level of different frequency components of a WDM optical signal. In some implementations, the output power detector 365 can only discern total power density.

In some implementations, one or more of the amplifiers 335, 340, 355, and 360 can be a laser optical amplifier, such as an erbium-doped fiber amplifier (EDFA). In some implementations, the amplifier can include a medium doped with a transition metal or other rare-earth element. The switchable-gain amplifier 300 can include EDFAs having different gains in the low-gain path and the high-gain path, respectively. EDFAs and similar amplifiers may not have a perfectly linear gain profile. In other words, when amplifying an optical signal having a finite bandwidth, the amplifier may amplify some wavelengths of the optical signal more than others. Amplifying an optical signal with multiple similar amplifiers in series without equalization can lead to a large cumulative disparity in channel power. Therefore, it may be beneficial to perform equalization of the signal at the amplifier. In some implementations, the output power detector 365 can discern power spectral density. Using the power spectral density information, the controller 140 and/or the OCM 265 can determine whether it would be desirable to flatten or equalize the optical signal. The decision to switch the wavelength blocker 345 into the circuit involves a trade-off between improving the optical signal flatness versus the attenuation of the optical signal caused by the wavelength blocker. If the controller 140 and/or the OCM 265 determines that optical signal flattening is desirable, it can set the switches 320 and 325 to route the optical signal through the wavelength blocker 345. The controller 140 and/or the OCM 265 can then control the wavelength blocker 345 to apply the desired wavelength-selective attenuation on the optical signal. In some implementations, the equalization can be controlled to keep the gain flatness to 1 dB across all channels of the WDM optical signal. If the controller 140 and/or the OCM 265 determine that equalization is not necessary, the controller 140 and/or the OCM 265 can route the optical signal through the variable optical attenuator 350, or bypass both of the wavelength blocker 345 and the VOA 350. The controller 140 and/or the OCM 265 can then set the variable optical attenuator 350 to attenuate the optical signal by the desired amount, including possibly zero attenuation.

The controller 140 and/or the OCM 265 can facilitate various modes of control. In some implementations, the ROADM 100 can have a set-and-forget control mode in which amplification and equalization parameters are set at a time of installation or initialization, and kept constant through the life of the ROADM 100 or until a modification, upgrade, or repair alters the hardware configuration or response of the ROADM 100. The set-and-forget control mode can benefit from noise loading as discussed in detail below with regard to the noise loading amplifiers 235 in FIG. 6. In some implementations, the ROADM 100 can have a continuous or real-time control mode. In continuous control modes, the controller 140 and/or the OCM 265 can receive two or more real-time inputs; e.g., from each input power detector 305 and output power detector 365. The controller 140 and/or the OCM 265 can monitor the input power detector 305 and transmit an alert or alarm if the incoming WDM optical signal is not within expected parameters; for example, the optical signal total power is too low or the power spectral density is too uneven across its bandwidth. The controller 140 and/or the OCM 265 can monitor the output power detector 365 and apply feedback to constrain the output signal power to a user-defined function by altering the gain and equalization of the switchable-gain amplifier 300. The user-defined function can specify the desired output optical signal power distribution. In some implementations, the user-function can be specified as power versus wavelength, power versus the inverse of the wavelength, power versus wavelength squared, or any other one-to-one mapping between power and wavelength/frequency. The continuous control modes can also benefit from the noise loading, discussed in detail below with regard to the noise loading amplifiers 235 in FIG. 6, which can improve the transient response and linearity of the switchable-gain amplifier 300. In a configuration where the link is operated by interaction with a software-defined network controller, the control scheme would be as follows. The SDN controller would configure the links (with components such as amplifiers, ROADMs, MCSs) for parameters such as gain, power spectral density targets, spectral slots to open. The links would then be monitored by means of telemetry. Any dramatic change in link conditions (due to a fiber cut, or a significant change in fiber loss) would result in the traffic traversing the link being rerouted along a different path. The controller would then re-optimize the link's parameters settings, and upon re-configuration, switch the previous traffic back onto the link. The re-optimization would rely upon estimates of the fiber losses derived through the amplifiers' input and output power monitors, as well as through any Raman gain signals (in the case Raman amplification is used on a subset of spans). These would in turn lead to a derivation of the new optimum launch powers for the link.

The amplifiers 335, 340, 355, and 360 can be fixed-gain or variable-gain amplifiers. Using a variable-gain amplifier can provide a more precise gain setting; however, fixed-gain amplifiers can be simpler, cheaper, and more efficient. In some implementations, fixed-gain low-gain amplifiers 335 and 355 can provide about 15 dB of gain. In some implementations, fixed-gain high-gain amplifiers 340 and 360 can provide about 22 dB of gain. In some implementations, variable-gain low-gain amplifiers 335 and 355 can provide about 10-18 dB of gain. In some implementations, variable-gain high-gain amplifiers 340 and 360 can provide about 16-24 dB of gain. Other gain values can be chose as appropriate for the particular design without departing from the scope of this disclosure. Implementations of the switchable-gain amplifier 300 that include variable-gain amplifiers may not need a variable optical attenuator 350. In such implementations, the switchable-gain amplifier can have a simplified design such as the design of the switchable-gain amplifier 400 described below with respect to FIG. 4.

Figure 4:
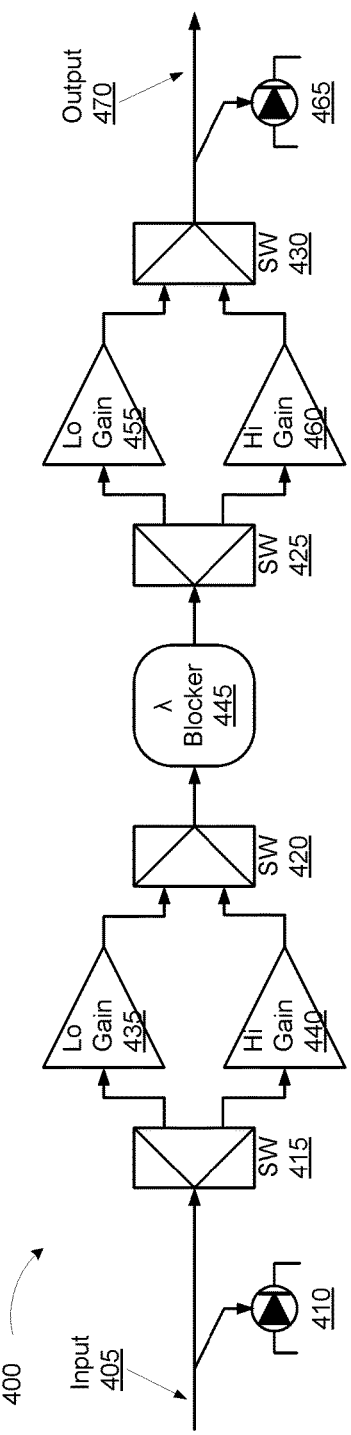
FIG. 4 is a schematic of an example switchable-gain amplifier for use in a ROADM, according to an illustrative implementation.

FIG. 4 is a schematic of an example switchable-gain amplifier 400 for use in a ROADM 100, according to an illustrative implementation. The switchable-gain amplifier 400 is similar to the switchable-gain amplifier 300, but differs in that it has only a wavelength blocker 445, but no variable optical attenuator. The switchable-gain amplifier 400 can be used as an egress amplifier 240, an ingress amplifier 245, or as an amplifier of the amplifier array 710 further described below with respect to FIG. 7. The switchable-gain amplifier 400 can amplify an optical signal with various levels of gain and, in some implementations, apply equalization as well. The switchable-gain amplifier 400 can switch between a low-gain path and a high-gain path, and includes a wavelength blocker 445 for performing wavelength-selective attenuation on the optical signal.

The switchable-gain amplifier 400 includes an input power detector 410. The input power detector 410 can include a tap and a photodetector. The tap can split a small portion of the input optical signal from the input 405 and direct it to the photodetector. The photodetector can include a photodiode or other light-sensitive semiconductor, sensor, or device. In some implementations, the input power detector 410 can discern power spectral density. That is, the input power detector 410 can determine the power level of different frequency components of a WDM optical signal. In some implementations, the input power detector 410 can only discern total power density.

The switchable-gain amplifier 400 includes switches 415, 420, 425, and 430. The switches 415, 420, 425, and 430 can route the optical signal through the low- or high-gain amplifier blocks, and through the wavelength blocker 445. The first switch 415 can route the optical signal to the first-stage low-gain amplifier block 435 or high-gain amplifier block 440. The second switch 420 can receive the optical signal from the selected first-stage amplifier block and route it to the wavelength blocker 445. The wavelength blocker 445 can be similar to the wavelength blocker 345 discussed above with regard to FIG. 3.

The third switch 425 can receive the optical signal from the wavelength blocker 445 and route it to the second-stage low-gain amplifier block 455 or high-gain amplifier block 460. The fourth switch 430 can receive the optical signal from the selected second-stage amplifier block and route it to the output 470. The switchable-gain amplifier 400 includes an output power detector 465. The output power detector 465 can be similar to the input power detector 410. The output power detector 465 can include a tap and a photodetector. The tap can split a small portion of the input optical signal from the output 470 and direct it to the photodetector. The photodetector can include a photodiode or other light-sensitive semiconductor, sensor, or device. In some implementations, the output power detector 465 can discern power spectral density. That is, the output power detector 465 can determine the power level of different frequency components of a WDM optical signal. Control of the components of the switchable-gain amplifier 400 can be similar to that described above with respect to the switchable-gain amplifier 300, including gain path selection, control of the wavelength blocker 445, and detection of failures outside of the ROADM 100.

Figure 5:
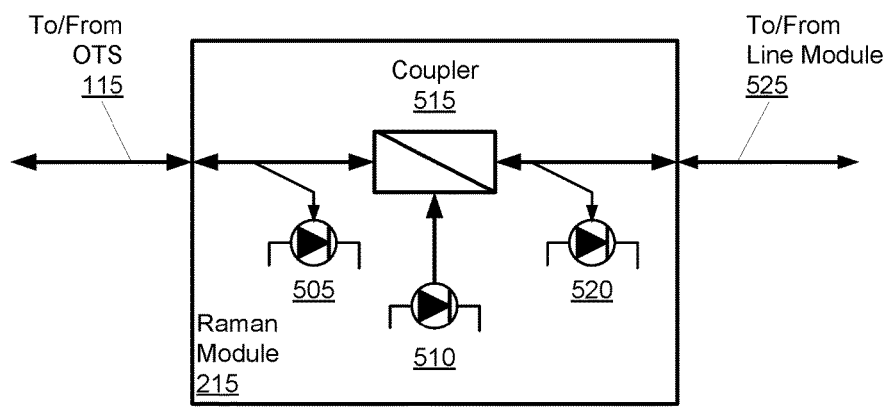
FIG. 5 is block diagram of a Raman module for use in a ROADM, according to an illustrative implementation.

FIG. 5 is block diagram of a Raman amplifier module 215 for use in a ROADM 100, according to an illustrative implementation. The Raman amplifier module 215 can amplify incoming and/or outgoing signals on the optical fiber link 115. The Raman amplifier module 215 includes an input power detector 505, a light source 510 coupled to the fiber optic line via a coupler 515, and an output power detector 520. The Raman amplifier module 215 can send the amplified optical signal to the line module 210 over the optical fiber link 525.

The Raman amplifier module 215 can use stimulated Raman scattering in an optical fiber or other Raman-active medium to amplify an optical signal. The light source 510 can emit light at a specific wavelength that is slightly offset from the wavelength of the signal to be amplified. The light source 510 can be a monochromatic or narrow bandwidth light source such as a laser. In some implementations, the Raman amplifier module 215 can include a backwards-pumping Raman gain block. Light from the light source 510 can be pumped into the optical fiber of the optical fiber link 115 using the coupler 515. In some implementations, the coupler 515 can direct the pumped light in a direction towards the optical fiber link 115, where stimulated Raman scattering can occur. In some implementations, the coupler 515 can direct the pumped light in a direction towards the optical fiber link 525, where stimulated Raman scattering can occur. In some implementations, the Raman amplifier module 215 can include a dedicated length of optical fiber or other medium separate and distinct from the optical fiber links 115 and 525 for performing the Raman amplification. A gain of the Raman amplifier module 215 can be controlled by adjusting the wavelength and/or intensity of the light source 510.

The input power detector 505 can be used to monitor whether the incoming signal over the optical fiber link 115 is within expected parameters for amplitude and flatness. In implementations of the ROADM 100 that include the Raman amplifier module 215, the input power detector 505 can monitor the input and/or output of the ROADM 100. If the input signal as measured by the input power detector 505 deviates sufficiently from expected parameters, the controller 140 and/or the optical channel monitor 265 may determine that something outside of the ROADM 100—e.g., the optical fiber link 115 or remote equipment sharing the optical fiber link 115—has failed. The OSC/OTDR 260 may be able to provide additional information about the failure and its location. The controller 140 and/or the optical channel monitor 265 can issue an alarm indicating a possible issue involving the optical fiber link 115 or a neighboring network element on the optical fiber link 115.

The output power detector 520 can measure the output optical signal transmitted to the line module 210 over the optical fiber link 525. Based on the power measured by the output power detector 520, the controller 140 and/or the optical channel monitor 265 can adjust the light source 510 to set the power of the optical signal transmitted over the optical fiber links 525.

Figure 6:
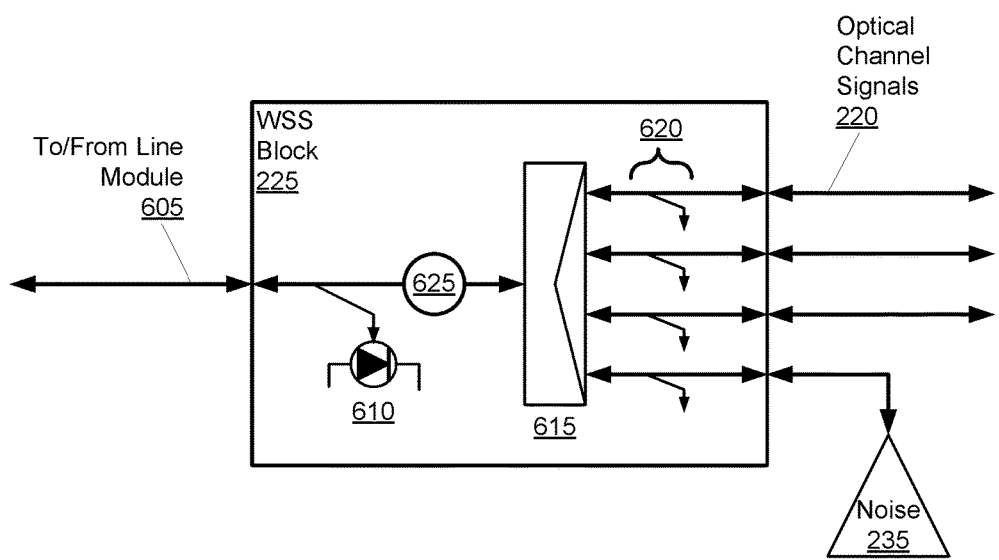
FIG. 6 is block diagram of a wavelength-selective switch for use in a ROADM, according to an illustrative implementation.

FIG. 6 is block diagram of a wavelength-selective switch (WSS) block 225 for use in a ROADM 100, according to an illustrative implementation. The WSS block 225 can demultiplex a WDM optical signal received from the line module 210 over the optical fiber link 605 into individual optical channel signals transmitted over the optical fiber links 220. The WSS block 225 can route any individual optical channel signals to any port. The WSS block 225 can also multiplex optical channel signals received over the optical fiber links 220 into a WDM optical signal transmitted over the optical fiber link 605. The WSS block 225 includes an input power detector 610, a WSS 615, and output power detectors 620. In the implementation shown in FIG. 6, the power detectors 610 and 620 are built into the WSS block 225. In some implementations, however, the power detectors 610 and 620 are discrete units external to the WSS block 225. In some implementations, the WSS 615 can be a 1×20, 1×24, or a 1×32 optical switch.

The WSS block 225 can include one or more optical attenuators 625 for attenuating the optical signals on one or both of the optical fiber link 605 or the optical fiber links 220. The optical attenuator 625 can have a fixed or variable attenuation, and can be switched in or out of the circuit by the controller 140 and/or the optical channel monitor 265. The controller 140 and/or the optical channel monitor 265 can switch or adjust the attenuation of the optical attenuator 625 based on the optical power levels indicated by the power detectors 610 and 620. The controller 140 can also provide an alert if one of the power detectors 610 or 620 measures an optical power level of a signal incoming to the WSS block 225 that has a power level above or below an expected level. Such a deviant measurement could indicate a failure in another part of the ROADM 100.

In some implementations, each WSS block 225 can include noise loading amplifiers 235 that can be connected to each unused port of the WSS 615. The noise loading amplifiers 235 can inject a "null" or "dummy" signal into each unused port of the WSS 615. In some implementations, the noise loading amplifiers 235 can be implemented in arrays of two, four, eight, or other number of noise loading amplifiers 235 per noise loading amplifier module. Each noise loading amplifier 235 can be coupled to a port of the WSS 615. Noise loading can improve the linearity and transient response of the ROADM 100, and can help to facilitate set-and-forget control of ROADM 100 components.

The gain of an optical amplifier may vary depending on the amplitude and bandwidth of the input signal. For example, the response of an optical amplifier amplifying a WDM optical signal may change depending on whether all or only some of the possible channels of the WDM optical signal are occupied. Noise loading using amplified spontaneous emission (ASE) can occupy the empty spectrum in a transport link. This can produce an accurate estimate of the nonlinear penalty of the link under full-load (as long as the noise matches the power spectral density channels would have achieved, despite the difference in spectral shape). This noise source could be implemented with an erbium-doped fiber amplifier (EDFA) in open-loop at the transmit node, for each ROADM block 110. At every ROADM block 110 (where traffic is added and dropped), the ASE noise can be filtered out, and added again at the next line-facing WSS block 225.

By employing noise loading to populate the unused channels and maintain a WDM optical signal that appears full to the amplifiers, the performance of the amplifiers can be kept constant and predictable both over the life of the ROADM 100 as the optical channels fill up and the ROADM 100 reaches full capacity, and in response to transient optical channel signals appearing and disappearing.

Noise loading unused optical channels of the ROADM 100 at the time of installation allows amplifier parameters to be set such that the desired output optical signal power amplitude and flatness can remain relatively constant over the life of the ROADM 100 despite increased channel loading over time. In some implementations, this can allow for set-and-forget operation, where amplifier parameters are set at the time of installation of the ROADM 100 and left constant unless a hardware failure or other issue necessitates a recalibration of the ROADM 100.

Noise loading can also help the ROADM maintain constant and predictable performance in response to transient optical channel signals appearing and disappearing. With regard to (b), in absence of noise loading, adding (or removing) an optical channel signal to a WDM optical signal may change the apparent amplitude or flatness of the WDM optical signal. The response of an optical amplifier amplifying the WDM optical signal may shift as a result of this transient such that the output of the ROADM 100 may deviate from the desired optical power amplitude and flatness. With noise loading, however, a new optical channel signal simply replaces the dummy signal previously maintained by the noise loading amplifier 235, and the WDM optical signal retains the same amplitude and flatness despite the added channel. This can mitigate the effects of transients and keeps the gain of the amplifier, and thus the output of the ROADM 100, relatively constant despite changes in channel loading.

Noise loading also allows for enhanced monitoring of optical signal-to-noise ratio (OSNR) by the optical channel monitors 265. Variation in the quality factor (Q) of a WDM optical signal can depend on both the proportion of channels occupied and the OSNR. With noise loading, all channels of the WDM optical signal appear full, thus any change in Q will primarily result from a change in OSNR. Thus the noise loading can facilitate instantaneous OSNR monitoring in a non-intrusive fashion. Monitoring the OSNR allows the ROADM 100 to track aging of its individual components including the line modules 210.

Figure 7:
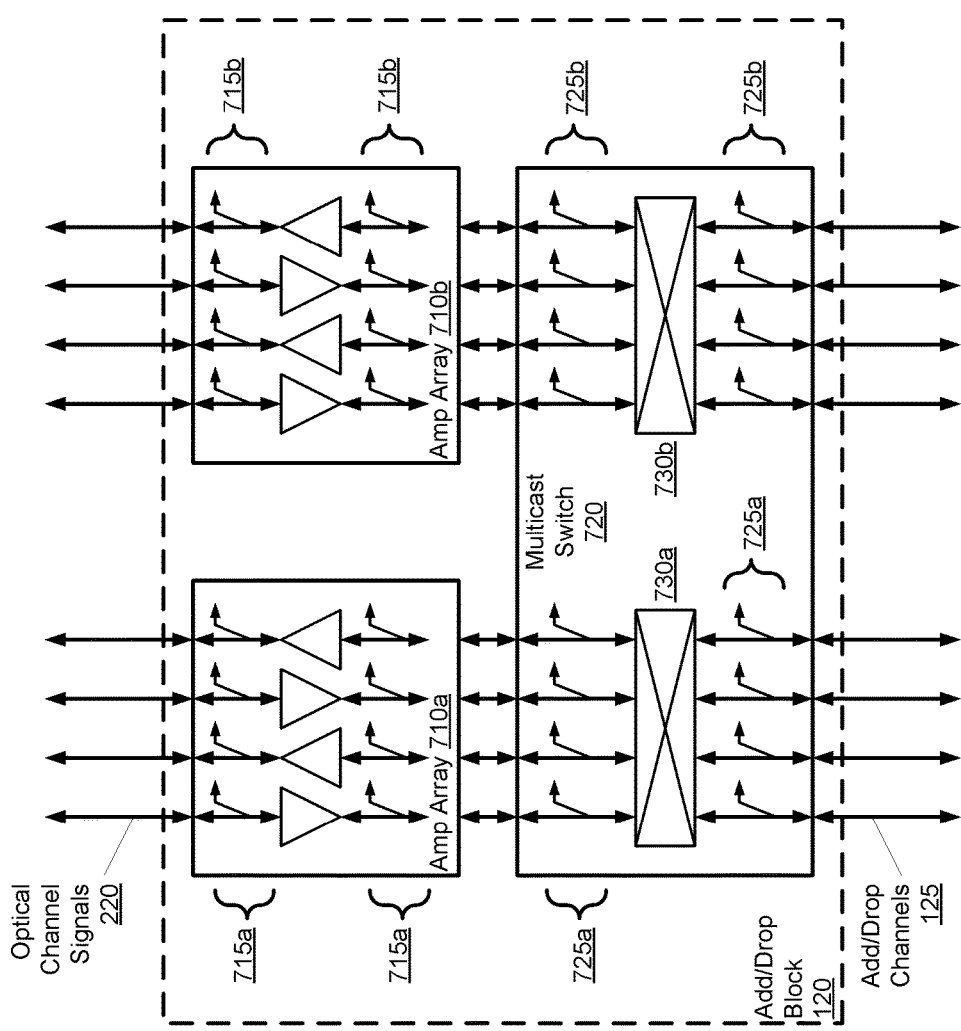
FIG. 7 is block diagram of an add/drop block for use in a ROADM, according to an illustrative implementation.

FIG. 7 is block diagram of an add/drop block 120 for use in a ROADM 100, according to an illustrative implementation. The add/drop block 120 can receive optical channel signals over the optical fiber links 220, amplify them, and route them to optical fiber links 125. Breaking out an individual optical channel signal from the WDM optical signal can be referred to as drop functionality. The add/drop block 120 can receive optical channel signals over the optical fiber links 125, amplify them, and route them to optical fiber links 220. Adding an individual optical channel signal to a WDM optical signal can be referred to as add functionality. The add/drop block 120 can include one or more amplifier arrays 710*a* and 710*b* (collectively "amplifier arrays 710") and one or more multicast switches 720. In some implementations, the amplifier arrays 710 can have a modular design with two, four, or eight amplifiers in each direction on an amplifier array module. Each amplifier of the amplifier arrays 710 can achieve a gain as high as 23 dB, which can support a large number of add/drop ports and higher baud rate terminal optics. Each amplifier array 710 can include optical power detectors 715*a* or 715*b* (collectively "optical power detectors 715") at the input and output of each amplifier. The multicast switch 720 can include an optical power detector 725 at each port.

Each amplifier of the amplifier arrays 710 can be a switchable-gain amplifier 300 or 400 as described above with respect to FIG. 3 or 4. In some implementations, each amplifier can be a simplified version of the switchable-gain amplifier 300 or 400 that includes low-gain and high-gain paths, but does not include a wavelength blocker such as wavelength blocker 345. In some implementations, each amplifier may include a variable optical attenuator such as VOA 350. In some implementations, each amplifier may include variable optical attenuator and only a single gain path. The optical power detectors 715 can measure the power of the optical signals before and after each amplifier. The controller 140 can adjust the gain of individual amplifiers to maintain the add/drop signals sent and received over the optical fiber links 220 at the desired amplitude. In some implementations, the controller 140 can use measurements of incoming optical signal power over the optical fiber links 220 to determine whether there is a failure elsewhere in the ROADM 100.

The amplifiers of the amplifier arrays 710 may not require equalization because, unlike the egress and ingress amplifiers of the ROADM block 110, the add/drop block 120 does not handle WDM optical signals, but rather the relatively narrower band optical fiber links 125. Furthermore, optical signals traversing the add/drop block 120 may not experience cascaded optical amplifiers that would compound the wavelength-dependent effects of the amplifiers. Rather, an optical signal traversing the add/drop block 120 may only pass through a single amplifier stage either before leaving the optical line system or after joining the optical line system. In contrast, when a WDM optical signal traverses a ROADM 100, it can pass through two or more optical amplifiers (for example, in ROADM block 110*a* and ROADM block 110*c*). If the WDM optical signal traverses multiple ROADMs 100 without equalization, the power differential between different wavelengths of the WDM optical signal may result in an individual optical channel signal having a power that is too high or too low.

The multicast switch 720 can include one or more optical switches 730*a* and 730*b* (collectively "optical switches 730") and optical power detectors 725*a* or 725*b* (collectively "optical power detectors 725") at each port of the optical switches 730. In some implementations, the optical switches 730 can be 4×32 optical switches. Multiple optical switches 730 can be combined for an overall 16×32 switch. In some implementations, other numbers of optical switches 730 having different numbers of inputs and outputs can be combined to create different multicast switch 720 configurations.

In some implementations, the multicast switch 720 can include a variable optical attenuator. The optical power detectors 725 can measure the power of the optical signals before and after each amplifier. The controller 140 can adjust the gain of individual amplifiers to maintain the add/drop signals sent and received over the optical fiber links 125 at the desired amplitude. In some implementations, the controller 140 can use measurements of incoming optical signal power over the optical fiber links 125 to determine whether a failure has occurred with equipment downstream from the ROADM 100 along the optical fiber links 125.

In some implementations, it may only be necessary to have optical power detectors at the edges of the add/drop block 120. That is, it may only be necessary to include optical power detectors 715 and 725 at or adjacent to the interfaces with the optical fiber links 220 and the optical fiber links 125. In this configuration, the controller 140 can set gain and attenuation parameters for each channel based on the measurements from the optical power detectors 715 and 725 and the controller's 140 knowledge of the switching state of the optical switches 730.

Figure 8:
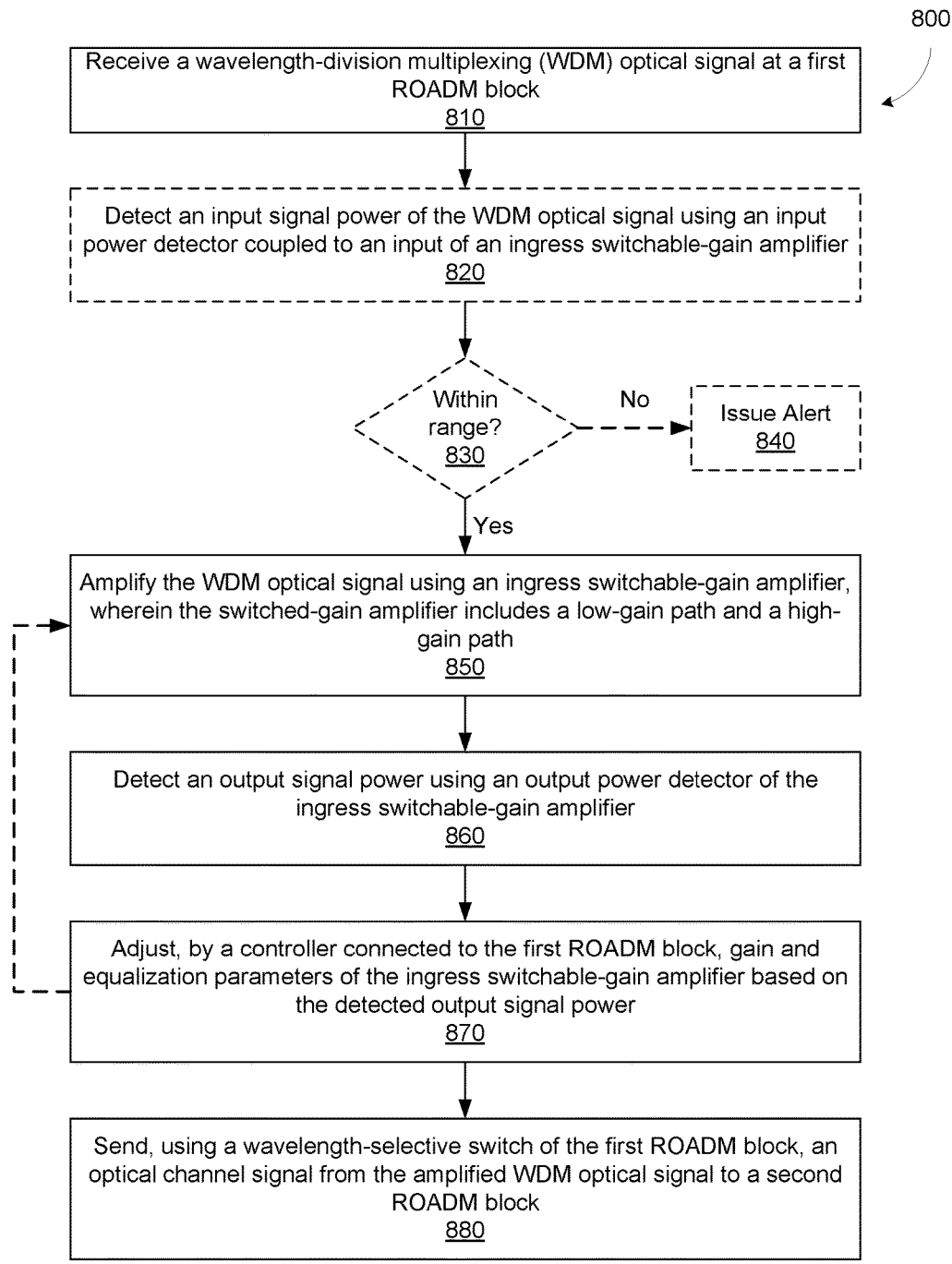
FIG. 8 is flowchart of an example method of operating a ROADM, according to an illustrative implementation.

FIG. 8 is flowchart of an example method 800 of operating a ROADM 100, according to an illustrative implementation. The method 800 includes receiving a wavelength-division multiplexing (WDM) optical signal at a first ROADM block 110 (stage 810). The method 800 can optionally include detecting an input signal power of the WDM optical signal using an input power detector coupled to an input of an ingress switchable-gain amplifier of the first ROADM block (stage 820). The method 800 can optionally include determining, by a controller of the ROADM, that the indication of the input signal power is outside of a specified optical power range (decision block 830). If the input signal power is outside of the specified optical power range, the method 800 includes issuing an alert by the controller (stage 840). If the input signal power is within the specified optical power range, the method 800 proceeds to stage 850. The method 800 includes amplifying the WDM optical signal using the ingress switchable-gain amplifier (stage 850). The method 800 includes detecting an output signal power of the amplified WDM optical signal using an output power detector coupled to an output of the ingress switchable-gain amplifier (stage 860). The method 800 includes adjusting, by a controller connected to the first ROADM block, gain and equalization parameters of the ingress switchable-gain amplifier based on the detected output signal power (stage 870). Based on the selection in stage 870, the method 800 includes setting the gain and equalization parameters of the ingress switchable-gain amplifier in stage 850. The method 800 includes sending, using a wavelength-selective switch of the first ROADM block, an optical channel signal from the amplified WDM optical signal to a second ROADM block of the plurality of ROADM blocks (stage 880).

The method 800 includes receiving a wavelength-division multiplexing (WDM) optical signal at a first ROADM block 110 (stage 810). The ROADM block 110 can receive the WDM optical signal over an optical fiber link 115. In some implementations, the method 800 can include amplifying the WDM optical signal with a Raman amplifier coupled between the ROADM block 110 and the optical fiber link 115.

The method 800 can optionally include detecting an input signal power of the WDM optical signal using an input power detector coupled to an input of an ingress switchable-gain amplifier of the first ROADM block (stage 820). In some implementations, the WDM optical signal can be received at a switchable-gain amplifier of the ROADM block 110, such as the switchable-gain amplifier 300 or 400. The input power detector 310 or 410 can detect the optical signal power of the WDM optical signal. In some implementations, the method 800 can include amplifying the WDM optical signal with a Raman amplifier coupled between the ROADM block 110 and the optical fiber link 115. In ROADM implementations including a Raman amplifier, the Raman amplifier module 215 can include an input power detector 505 for detecting the input signal power of the WDM optical signal.

The method 800 can include determining, by a controller of the ROADM, that the indication of the input signal power is outside of a specified optical power range (decision block 830). In some implementations, a controller 140 or an optical channel monitor 265 can receive the measured optical power level and determine whether the WDM optical signal is within acceptable parameters for absolute power amplitude and power spectral density. If the input signal power is outside of the specified optical power range, the method 800 includes issuing an alert by the controller 140 or the optical channel monitor 265 (stage 840). In some implementations, the second ROADM block 110 can monitor a condition of the optical fiber link 115 using an optical time-domain reflectometer (OTDR) 260. The OTDR can monitor a condition of the optical fiber link 115 and remote equipment along the link and, in the event of a link failure, provide a notification including the location of the failure. If the controller 140 or the optical channel monitor 265 issues an alert due to an out-of-spec input optical power as determined at decision block 830, the alert can include information regarding the condition of the optical fiber link as determined by the OTDR 260. If the input signal power is within the specified optical power range, the method 800 proceeds to stage 850.

The method 800 includes amplifying the WDM optical signal using the ingress switchable-gain amplifier (stage 850). The ROADM block 110 can amplify the WDM optical signal with a switchable-gain amplifier such as the switchable-gain amplifier 300 or 400. Based on an output optical signal power as detected at stage 860 below, the controller 140 or the optical channel monitor 265 can adjust gain parameters (including selecting the low-gain path or the high-gain path) of the switchable-gain amplifier 300 or 400 at stage 870 below. In some implementations, the controller 140 or the optical channel monitor 265 can adjust the equalization parameters of the switchable-gain amplifier 300 or 400.

The method 800 includes detecting an output signal power of the amplified WDM optical signal using an output power detector coupled to an output of the ingress switchable-gain amplifier (stage 860). The switchable-gain amplifier 300 or 400 of the ROADM block 110 can include an output power detector 365 or 465. In some implementations, the output power detector 365 or 465 can detect total power amplitude or power spectral density (i.e., power at each wavelength). The output power detector 365 or 465 can send an indication of the output signal power to the controller 140 or the optical channel monitor 265. In some implementations, the indication of the output signal power can include information regarding power spectral density.

The method 800 includes adjusting, by a controller connected to the first ROADM block, gain and equalization parameters of the ingress switchable-gain amplifier based on the detected output signal power (stage 870). The controller 140 or the optical channel monitor 265 can receive the indication of the output signal power from the output power detector 365 or 465. Based on the selection in stage 870, the method 800 includes adjusting the gain and equalization parameters of the ingress switchable-gain amplifier in stage 850. The controller 140 or the optical channel monitor 265 can use the information to select either the low-gain path or the high-gain path for amplification in stage 850. In some implementations, the switchable-gain amplifier 300 or 400 can include a wavelength blocker 345 to compensate for wavelength-based nonlinearities of the optical amplifiers. The controller 140 or the optical channel monitor 265 can adjust the equalization parameters of the wavelength-blocker such that it selectively attenuates certain wavelengths of the WDM optical signal. In some implementation, the controller 140 or the optical channel monitor 265 can use the power spectral density information to set the wavelength blocker 345 to apply flattening or equalization to the optical signal to achieve a desired flatness of the amplified signal; for example, the controller 140 or the optical channel monitor 265 can set the wavelength blocker 345 to maintain an output signal flatness of 1 dB across the signal bandwidth. In some implementations, the switchable-gain amplifier 300 or 400 can also include a variable optical attenuator 350. The controller 140 or the optical channel monitor 265 can adjust the variable optical attenuator 350 to fine tune the overall gain of the ingress switchable-gain amplifier 300.

The method 800 includes sending, using a wavelength-selective switch of the first ROADM block, an optical channel signal from the amplified WDM optical signal to a second ROADM block of the plurality of ROADM blocks (stage 880). The switchable-gain amplifier 300 or 400 can send an amplified, but relatively spectrally flat, WDM optical signal to a wavelength-selective switch (WSS) 225 of the first ROADM block 110. The WSS block 225 can demultiplex the amplified WDM optical signal, and send an optical channel signal from the amplified WDM optical signal to a second ROADM block 110. In some implementations, a second WSS block 225 of the second ROADM block 110 can multiplex the optical channel signal into a second WDM optical signal. The second ROADM block 110 may also include amplifier stages employing switchable-gain amplifiers of a similar technology to the amplifiers of the first ROADM block 110. In some implementations, the equalization performed by the wavelength blocker 345 can mitigate the effect of cumulative wavelength-dependent gain nonlinearity of the multiple amplifiers in series.

In some implementations, a plurality of noise loading amplifiers 235 can introduce a noise loading signal into each unused port of the wavelength-selective switch 225. The wavelength-selective switch 225 can send a second WDM optical signal to an egress switchable-gain amplifier of the ROADM block 110 such as the switchable-gain amplifier 300 or 400. The egress switchable-gain amplifier 300 or 400 can amplify the second WDM optical signal. An output power detector 365 or 465 of the egress switchable-gain amplifier 300 or 400 can detect a second output signal power of the amplified second WDM optical signal. The controller 140 or the optical channel monitor 265 can adjust gain and equalization parameters of the egress switchable-gain amplifier based on the detected second output signal power. The method 800 can perform additional stages or few stages, or perform the stages in different orders, without departing from the scope of the disclosure.

Figure 9:
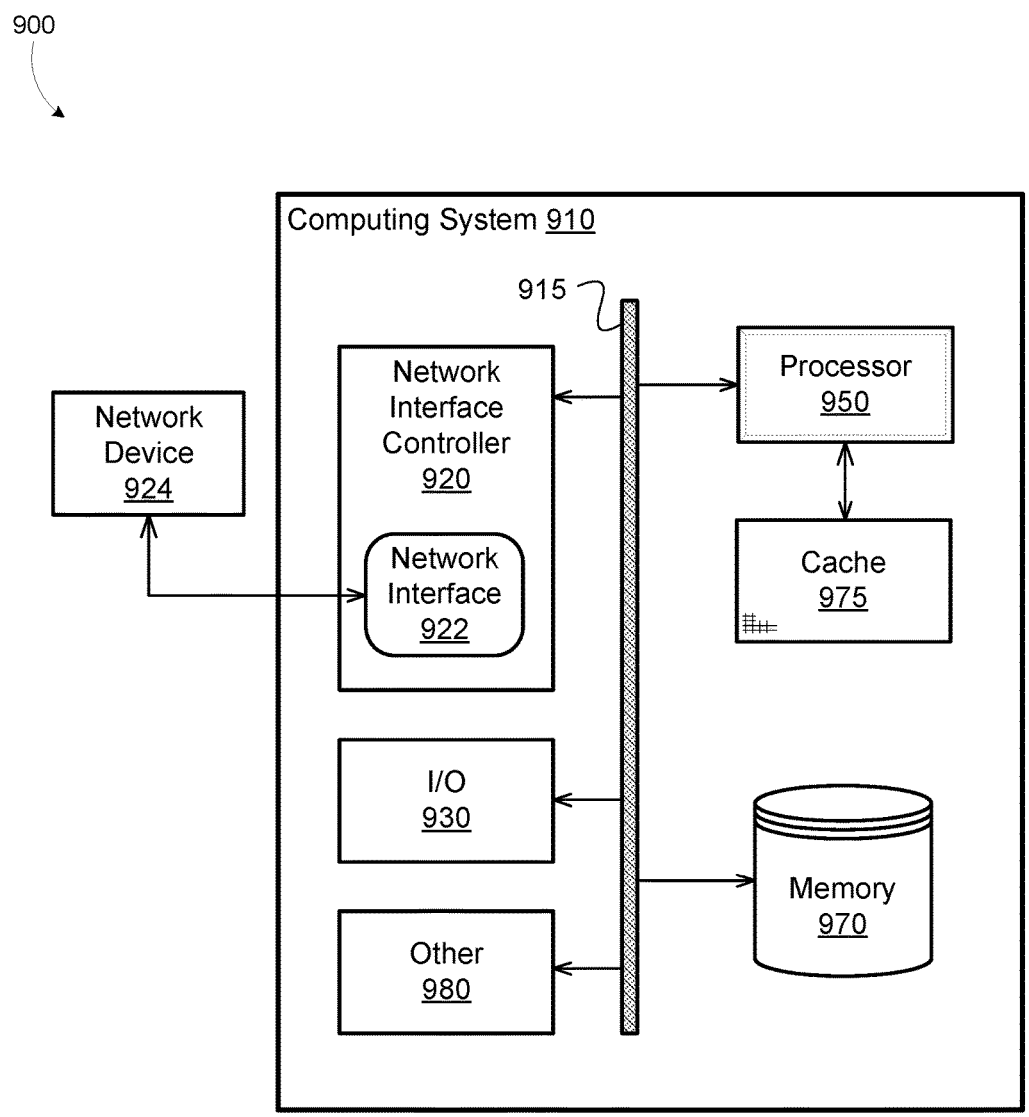
FIG. 9 is a block diagram illustrating a general architecture for a computer system that may be employed to implement elements of the systems and methods described and illustrated herein, according to an illustrative implementation.

FIG. 9 is a block diagram illustrating a general architecture for a computer system 900 that may be employed to implement elements of the systems and methods described and illustrated herein, according to an illustrative implementation. The computing system 900 may be utilized in implementing the methods of operating, for example, a ROADM 100 shown in FIG. 1-8, or any component thereof including the controller 140 and other blocks/modules.

In broad overview, the computing system 910 includes at least one processor 950 for performing actions in accordance with instructions and one or more memory devices 970 or 975 for storing instructions and data. The illustrated example computing system 910 includes one or more processors 950 in communication, via a bus 915, with at least one network interface controller 920 with one or more network interface ports 922 connecting to one or more network devices 924, memory 970, and any other devices 980, e.g., an I/O interface. Generally, a processor 950 will execute instructions received from memory. The processor 950 illustrated incorporates, or is directly connected to, cache memory 975.

In more detail, the processor 950 may be any logic circuitry that processes instructions, e.g., instructions fetched from the memory 970 or cache 975. In many embodiments, the processor 950 is a microprocessor unit or special purpose processor. The computing device 900 may be based on any processor, or set of processors, capable of operating as described herein. In some implementations, the processor 950 can be capable of executing the methods of maintaining a user session during an access network handover shown in FIGS. 2-5. The processor 950 may be a single core or multi-core processor. The processor 950 may be multiple processors. In some implementations, the processor 950 can be configured to run multi-threaded operations. In some implementations, the processor 950 may host one or more virtual machines or containers, along with a hypervisor or container manager for managing the operation of the virtual machines or containers. In such implementations, the method shown in FIG. 8 can be implemented within the virtualized or containerized environments provided on the processor 950.

The memory 970 may be any device suitable for storing computer readable data. The memory 970 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-ray® discs). A computing system 900 may have any number of memory devices 970. In some implementations, the memory 970 can include instructions corresponding to the method of operating a reconfigurable optical add/drop multiplexer (ROADM) shown in FIG. 8. In some implementations, the memory 970 supports virtualized or containerized memory accessible by virtual machine or container execution environments provided by the computing system 910.

The cache memory 975 is generally a form of computer memory placed in close proximity to the processor 950 for fast read times. In some implementations, the cache memory 975 is part of, or on the same chip as, the processor 950. In some implementations, there are multiple levels of cache 975, e.g., L2 and L3 cache layers.

The network interface controller 920 manages data exchanges via the network interfaces 922 (also referred to as network interface ports). The network interface controller 920 handles the physical and data link layers of the OSI model for network communication. In some implementations, some of the network interface controller's tasks are handled by the processor 950. In some implementations, the network interface controller 920 is part of the processor 950. In some implementations, a computing system 910 has multiple network interface controllers 920. The network interfaces 922 are connection points for physical network links. In some implementations, the network interface controller 920 supports wireless network connections and an interface port 922 is a wireless receiver/transmitter. Generally, a computing device 910 exchanges data with other network devices 924 via physical or wireless links to network interfaces 922. In some implementations, the network interface controller 920 implements a network protocol such as Ethernet.

The other network devices 924 are connected to the computing device 910 via a network interface port 922. The other network devices 924 may be peer computing devices, network devices, or any other computing device with network functionality. For example, a first network device 924 may be a network device such as a hub, a bridge, a switch, or a router, connecting the computing device 910 to a data network such as the Internet.

The other devices 980 may include an I/O interface, external serial device ports, and any additional co-processors. For example, a computing system 910 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 900 includes an additional device 980 such as a coprocessor, e.g., a math co-processor can assist the processor 950 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The operations may be executed within the native environment of the data processing apparatus or within one or more virtual machines or containers hosted by the data processing apparatus.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more virtual machines or containers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A reconfigurable optical add/drop multiplexer (ROADM) comprising:
   a plurality of interconnected ROADM blocks, each ROADM block including an egress switchable-gain amplifier, an output power detector coupled to an output of the egress switchable-gain amplifier, and a wavelength-selective switch coupled to an input of the egress switchable-gain amplifier;
   a plurality of noise loading amplifiers, each noise loading amplifier coupled to a port of the wavelength-selective switch;
   a plurality of add/drop blocks coupled to the wavelength-selective switches of the plurality of ROADM blocks; and
   a controller configured to:
     activate each noise loading amplifier that is coupled to an unused port of the wavelength-selective switch;
     receive an indication of an output signal power from the output power detector; and
     adjust gain and equalization parameters of the egress switchable-gain amplifier based on the received indication of the output signal power.

2. The ROADM of claim 1, wherein:
   the egress switchable-gain amplifier includes a low-gain fiber amplifier and a high-gain fiber amplifier; and
   adjusting the gain and equalization parameters includes selectively routing an optical signal through the low-gain fiber amplifier or the high-gain fiber amplifier.

3. The ROADM of claim 1, wherein:
   the egress switchable-gain amplifier includes a variable-gain fiber amplifier; and
   adjusting the gain and equalization parameters includes adjusting a gain of the variable-gain fiber amplifier.

4. The ROADM of claim 1, wherein each ROADM block comprises:
   an ingress switchable-gain amplifier configured to receive a wavelength-division multiplexed (WDM) signal over an optical fiber link; and
   a second output power detector coupled to an output of the ingress switchable-gain amplifier,
   wherein the controller is configured to:
     receive an indication of a second output signal power from the second output power detector, and
     adjust gain and equalization parameters of the ingress switchable-gain amplifier based on the indication of the second output signal power.

5. The ROADM of claim 1, wherein:
   the output power detector can discern spectral power density; and
   the egress switchable-gain amplifier includes an equalizer for flattening the amplifier's output across a frequency range of the amplifier.

6. The ROADM of claim 5, wherein:
   the equalizer comprises a wavelength blocker; and adjusting the gain and equalization parameters includes selectively attenuating one or more wavelengths of an optical signal passing through the egress switchable-gain amplifier based on the spectral power density discerned by the output power detector.

7. The ROADM of claim 1, wherein:
the wavelength-selective switch is a C-band wavelength-selective switch;
the egress switchable-gain amplifier is a C-band ingress switchable-gain amplifier; and
each ROADM block comprises an L-band wavelength-selective switch coupled to an L-band egress switchable-gain amplifier.

8. The ROADM of claim 1, wherein each ROADM block comprises:
an input power detector coupled to an input of the egress switchable-gain amplifier, wherein the controller is configured to receive an indication of an input signal power from the input power detector, determine that the indication of the input signal power is outside of a specified optical power range, and issue an alert based on the determination.

9. The ROADM of claim 8, wherein each ROADM block comprises:
an optical time-domain reflectometer for monitoring a condition of an optical fiber link coupled to the ROADM block, wherein the alert includes information regarding the condition of the optical fiber link.

10. The ROADM of claim 1, wherein each ROADM block comprises:
a Raman amplifier coupled between an optical fiber link and the ROADM block;
a second input power detector coupled to an input of the Raman amplifier; and
a second output power detector coupled to an output of the Raman amplifier.

11. The ROADM of claim 1, wherein each add/drop block comprises:
a multicast switch coupled to a plurality of optical fiber links; and
an array of switchable-gain amplifiers coupled between the multicast switch and the wavelength selective switches, wherein:
each amplifier of the array includes a second output power detector, and
the controller is configured to receive indications of a second output signal power from the second output power detectors and adjust respective gain parameters of each amplifier of the array based on the received indications of the second output signal power.

12. The ROADM of claim 1, wherein:
the plurality of ROADM blocks and the plurality of add/drop blocks are interconnected via a fiber shuffle panel.

13. A method of operating a reconfigurable optical add/drop multiplexer (ROADM) comprising:
introducing a noise loading signal into each unused port of a wavelength-selective switch of a ROADM block of a plurality of ROADM blocks using a plurality of noise loading amplifiers;
sending a wavelength-division multiplexed (WDM) optical signal from the wavelength-selective switch to an egress switchable-gain amplifier of the ROADM block;
amplifying the WDM optical signal using the egress switchable-gain amplifier;
detecting an output signal power of the amplified WDM optical signal using an output power detector coupled to an output of the egress switchable-gain amplifier; and
adjusting, by a controller connected to the ROADM block, gain and equalization parameters of the egress switchable-gain amplifier based on the detected output signal power.

14. The method of claim 13, wherein:
the egress switchable-gain amplifier includes a low-gain fiber amplifier and a high-gain fiber amplifier; and
adjusting the gain and equalization parameters includes selectively routing the WDM optical signal through the low-gain fiber amplifier or the high-gain fiber amplifier.

15. The method of claim 13, wherein:
the egress switchable-gain amplifier includes a variable-gain fiber amplifier; and
adjusting the gain and equalization parameters includes adjusting a gain of the variable-gain fiber amplifier.

16. The method of claim 13, comprising:
receiving a second WDM optical signal over an optical fiber link at the ROADM block;
amplifying the second WDM optical signal using an ingress switchable-gain amplifier;
detecting a second output signal power of the amplified second WDM optical signal using a second output power detector coupled to an output of the ingress switchable-gain amplifier;
adjusting, by the controller, gain and equalization parameters of the ingress switchable-gain amplifier based on the detected second output signal power; and
sending, using the wavelength-selective switch, an optical channel signal from the amplified second WDM optical signal to a second ROADM block of the plurality of ROADM blocks.

17. The method of claim 13, wherein:
detecting the output signal power includes discerning spectral power density of the amplified WDM optical signal, and
adjusting the gain and equalization parameters includes selectively attenuating one or more wavelengths of the WDM optical signal passing through the egress switchable-gain amplifier based on the discerned spectral power density.

18. The method of claim 13, comprising:
detecting an input signal power of the WDM optical signal using an input power detector coupled to an input of the egress switchable-gain amplifier;
determining, by the controller, that the indication of the input signal power is outside of a specified optical power range; and
issuing, by the controller, an alert based on the determination.

19. The method of claim 18, comprising:
monitoring, by an optical time-domain reflectometer, a condition of an optical fiber link coupled to the ROADM block; and
including information regarding the condition of the optical fiber link in the alert.

20. The method of claim 13, comprising:
detecting a plurality of second output signal powers using a plurality of second output power detectors, wherein each second output power detector is coupled to an amplifier of an array of switchable-gain amplifiers coupled between a multicast switch and the wavelength-selective switch; and adjusting respective gain parameters of each amplifier of the array based on the detected plurality of second output signal powers.

* * * * *